United States Patent
Wu et al.

(10) Patent No.: US 11,663,464 B2
(45) Date of Patent: May 30, 2023

(54) DEEP NEURAL NETWORK WITH LOW-PRECISION DYNAMIC FIXED-POINT IN RECONFIGURABLE HARDWARE DESIGN

(71) Applicant: Kneron (Taiwan) Co., Ltd., Taipei (TW)

(72) Inventors: Jie Wu, San Diego, CA (US); Bike Xie, San Diego, CA (US); Hsiang-Tsun Li, Taichung (TW); Junjie Su, San Diego, CA (US); Chun-Chen Liu, San Diego, CA (US)

(73) Assignee: Kneron (Taiwan) Co., Ltd., Taipei (TW)

( * ) Notice: Subject to any disclaimer, the term of this patent is extended or adjusted under 35 U.S.C. 154(b) by 760 days.

(21) Appl. No.: 16/551,743

(22) Filed: Aug. 27, 2019

(65) Prior Publication Data
US 2020/0097816 A1    Mar. 26, 2020

Related U.S. Application Data

(60) Provisional application No. 62/733,643, filed on Sep. 20, 2018.

(51) Int. Cl.
*G06N 3/08* (2023.01)
*G06F 7/544* (2006.01)
*G06N 3/063* (2023.01)

(52) U.S. Cl.
CPC .............. *G06N 3/08* (2013.01); *G06F 7/5443* (2013.01); *G06N 3/063* (2013.01)

(58) Field of Classification Search
CPC ........ G06N 3/08; G06N 3/063; G06N 3/0454; G06F 7/5443; G06F 2207/382; G06F 2207/3824; G06F 2207/4824
See application file for complete search history.

(56) References Cited

U.S. PATENT DOCUMENTS

| 11,023,801 B2 | 6/2021 | Ouyang | |
| 2009/0319987 A1* | 12/2009 | Bartz | G06F 8/4441 717/109 |

(Continued)

FOREIGN PATENT DOCUMENTS

| CN | 106502626 A | 3/2017 |
| CN | 107480770 A | 12/2017 |

(Continued)

OTHER PUBLICATIONS

Wang Peiqi et al., Journal of Computer Research and Development, A Comparison Among Different Numeric Representations in Deep Convolution Neural Networks, 2017, p. 1348-1356, vol. 54(6), Beijing, China, 2017.

*Primary Examiner* — Ajay Ojha
(74) *Attorney, Agent, or Firm* — Winston Hsu

(57) ABSTRACT

A system for operating a floating-to-fixed arithmetic framework includes a floating-to-fix arithmetic framework on an arithmetic operating hardware such as a central processing unit (CPU) for computing a floating pre-trained convolution neural network (CNN) model to a dynamic fixed-point CNN model. The dynamic fixed-point CNN model is capable of implementing a high performance convolution neural network (CNN) on a resource limited embedded system such as mobile phone or video cameras.

6 Claims, 6 Drawing Sheets

(56) References Cited

U.S. PATENT DOCUMENTS

| | | |
|---|---|---|
| 2017/0220929 A1 | 8/2017 | Rozen |
| 2018/0129935 A1 | 5/2018 | Kim |
| 2018/0322607 A1* | 11/2018 | Mellempudi ......... G06F 7/5443 |
| 2020/0074285 A1* | 3/2020 | Kim ....................... G06N 3/063 |

FOREIGN PATENT DOCUMENTS

| | | |
|---|---|---|
| CN | 107636697 A | 1/2018 |
| CN | 108009625 A | 5/2018 |
| WO | 2018/152205 A1 | 8/2018 |

* cited by examiner

FIG. 4A

| W(1,1) | W(1,2) | W(1,3) |
|---|---|---|
| W(2,1) | W(2,2) | W(2,3) |
| W(3,1) | W(3,2) | W(3,3) |

FIG. 4B

| Y(1,1) | Y(1,2) | Y(1,3) |
|---|---|---|
| Y(2,1) | Y(2,2) | Y(2,3) |
| Y(3,1) | Y(3,2) | Y(3,3) |

FIG. 4C

DEEP NEURAL NETWORK WITH LOW-PRECISION DYNAMIC FIXED-POINT IN RECONFIGURABLE HARDWARE DESIGN

CROSS REFERENCE TO RELATED APPLICATIONS

This application claims the benefit of U.S. Provisional Application No. 62/733,643, filed Sep. 20, 2018 which is incorporated herein by reference.

BACKGROUND OF THE INVENTION

1. Field of the Invention

This present invention is related to machine learning technology, in particular, an arithmetic framework system transforming a floating pre-trained convolution neural network model to a dynamic fixed-point convolution neural network model.

2. Description of the Prior Art

A large-scale convolutional neural network (CNN) is recognized as one of the most remarkable neural networks achieving significant success in the cutting-edge tasks in the fields of machine learning applications, such as image recognition, image classification, speech recognition, natural language processing, and video classification. Because of a large amount of data sets, intensive computational power, and memory storage, the high-precision arithmetic operators of CNN architectures become bigger and complicate to achieve better performance.

However, it is difficult to make a resource limited embedded system with a low memory storage and low computing capabilities, such as a mobile phone and video monitor, to achieve high performance with the CNN architecture. This becomes a bottleneck to implement high performance convolution neural network (CNN) on a resource limited embedded system.

SUMMARY OF THE INVENTION

An embodiment discloses an arithmetic framework system comprising a floating-to-fixed arithmetic framework on an arithmetic operating hardware and a memory. The floating-to-fixed arithmetic framework is used to receive a floating pre-trained convolution neural network (CNN) model. The floating-to-fixed arithmetic framework is further used to retrieve weights, biases, and activations for each CNN layer of the floating pre-trained CNN model. The floating-to-fixed arithmetic framework is further used to determine dynamic fixed-point formats of the weights, the biases, and the activations for the each CNN layer of the floating pre-trained CNN model to generate the dynamic fixed-point format weights, the dynamic fixed-point format biases, and the dynamic fixed-point format activations for the each CNN layer of the floating pre-trained CNN model. The floating-to-fixed arithmetic framework is further used to sum products of each dynamic fixed-point format weight and its corresponding dynamic fixed-point format activation for the each CNN layer of the floating pre-trained CNN model for generating a first output of each CNN layer of a CNN model. The floating-to-fixed arithmetic framework is further used to truncate the first output of the each CNN layer of the CNN model according to the dynamic fixed-point format activations for generating a second output of the each CNN layer of the CNN model. The floating-to-fixed arithmetic framework is further used to add the dynamic fixed-point format bias with the second output of the each CNN layer for generating a third output of the each CNN layer of the CNN model. The floating-to-fixed arithmetic framework is further used to truncate the third output of the each CNN layer of the CNN model according to the dynamic fixed-point format activations for generating a dynamic fixed-point output of the each CNN layer of the CNN model. The floating-to-fixed arithmetic framework is further used to combine dynamic fixed-point outputs of CNN layers of the CNN model to generate a dynamic fixed-point CNN model. The proposed framework will do the truncation and combination one by one until the end of the outputs of the CNN layers. The floating-to-fixed arithmetic framework is further used to output the dynamic fixed-point CNN model. The memory is configured to save the floating pre-trained convolution neural network (CNN) model, the CNN model, and the dynamic fixed-point CNN model.

Another embodiment discloses a method for operating a floating-to-fixed arithmetic framework. The method comprises inputting a floating pre-trained convolution neural network (CNN) model and activations for each CNN layer of the floating pre-trained CNN model to the floating-to-fixed arithmetic framework. The method comprises retrieving weights, biases, and activations for each CNN layer of the floating pre-trained CNN model. The method further comprises determining dynamic fixed-point formats of the weights, the bias, and the activations for the each CNN layer of the floating pre-trained CNN model to generate dynamic fixed-point format weights, a dynamic fixed-point format bias, and dynamic fixed-point format activations for the each CNN layer of the floating pre-trained CNN model. The method further comprises summing products of each dynamic fixed-point weight and its corresponding dynamic fixed-point format activation for the each CNN layer of the floating pre-trained CNN model for generating a first output of each CNN layer of a CNN model. The method further comprises truncating the first output of the each CNN layer of the CNN model according to the dynamic fixed-point format activations for generating a second output of the each CNN layer of the CNN model. The method further comprises adding the dynamic fixed-point format bias with the second output of the each CNN layer of the CNN model for generating a third output of the each CNN layer of the CNN model. The method further comprises truncating the third output of the each CNN layer of the CNN model according to the dynamic fixed-point format activations for generating a dynamic fixed-point output of the each CNN layer of the CNN model. The method further comprises combining dynamic fixed-point outputs of CNN layers of the CNN model to generate a dynamic fixed-point CNN model, and the method further comprises the floating-to-fixed arithmetic framework outputting the dynamic fixed-point CNN model.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4A-4C is an embodiment of an input image based on 3×3 computing engine at a channel.

DETAILED DESCRIPTION

The present invention provides a floating-to-fixed arithmetic framework system that outputs a dynamic fixed-point CNN model.

Figure 1:
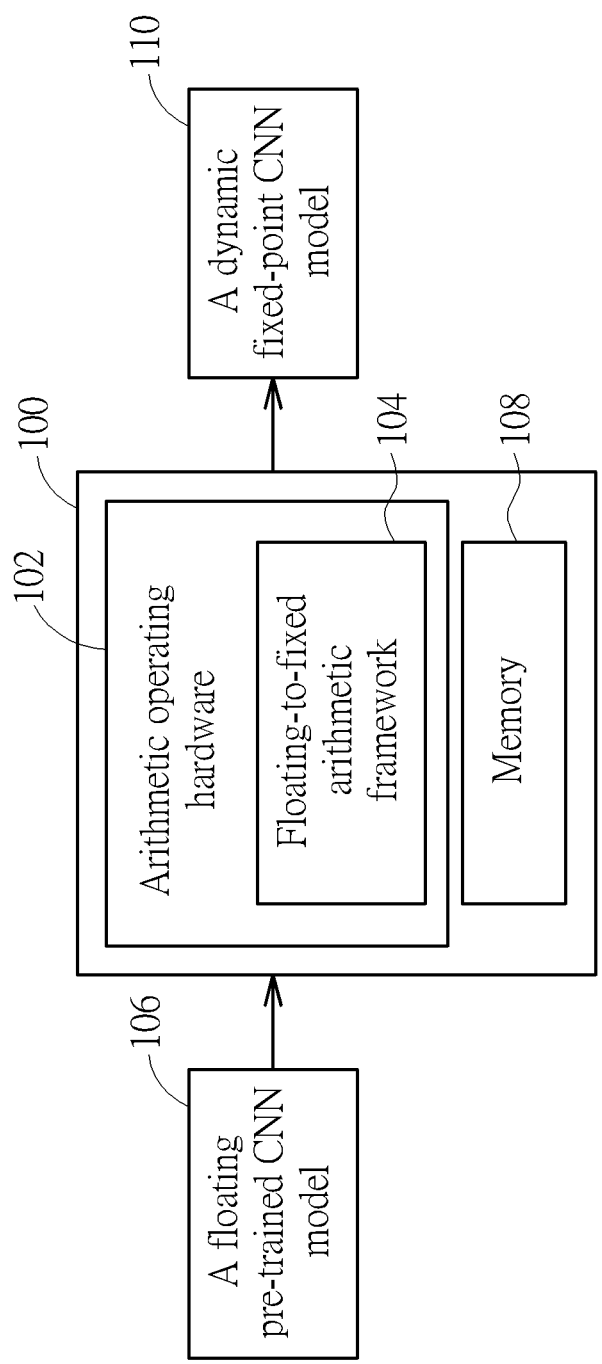
FIG. 1 shows an arithmetic framework system according to an embodiment.

FIG. 1 shows an arithmetic framework system according to an embodiment. The arithmetic framework system 100 comprises an arithmetic operating hardware 102 and a memory 108 is used to save a floating pre-trained convolution neural network (CNN) model, a CNN model, and a dynamic fixed-point CNN model. The arithmetic operating hardware 102 has a floating-to-fixed arithmetic framework 104 executed thereon. The arithmetic operating hardware can be a central processing unit (CPU) or a graphics processing unit (GPU). A floating pre-trained convolution neural network (CNN) model 106 is inputted to the floating-to-fixed arithmetic framework 104. The floating-to-fixed arithmetic framework 104 outputs a dynamic fixed-point CNN model 110. The dynamic fixed-point CNN model 110 is the optimized CNN model which fit hardware constraints.

Figure 2:
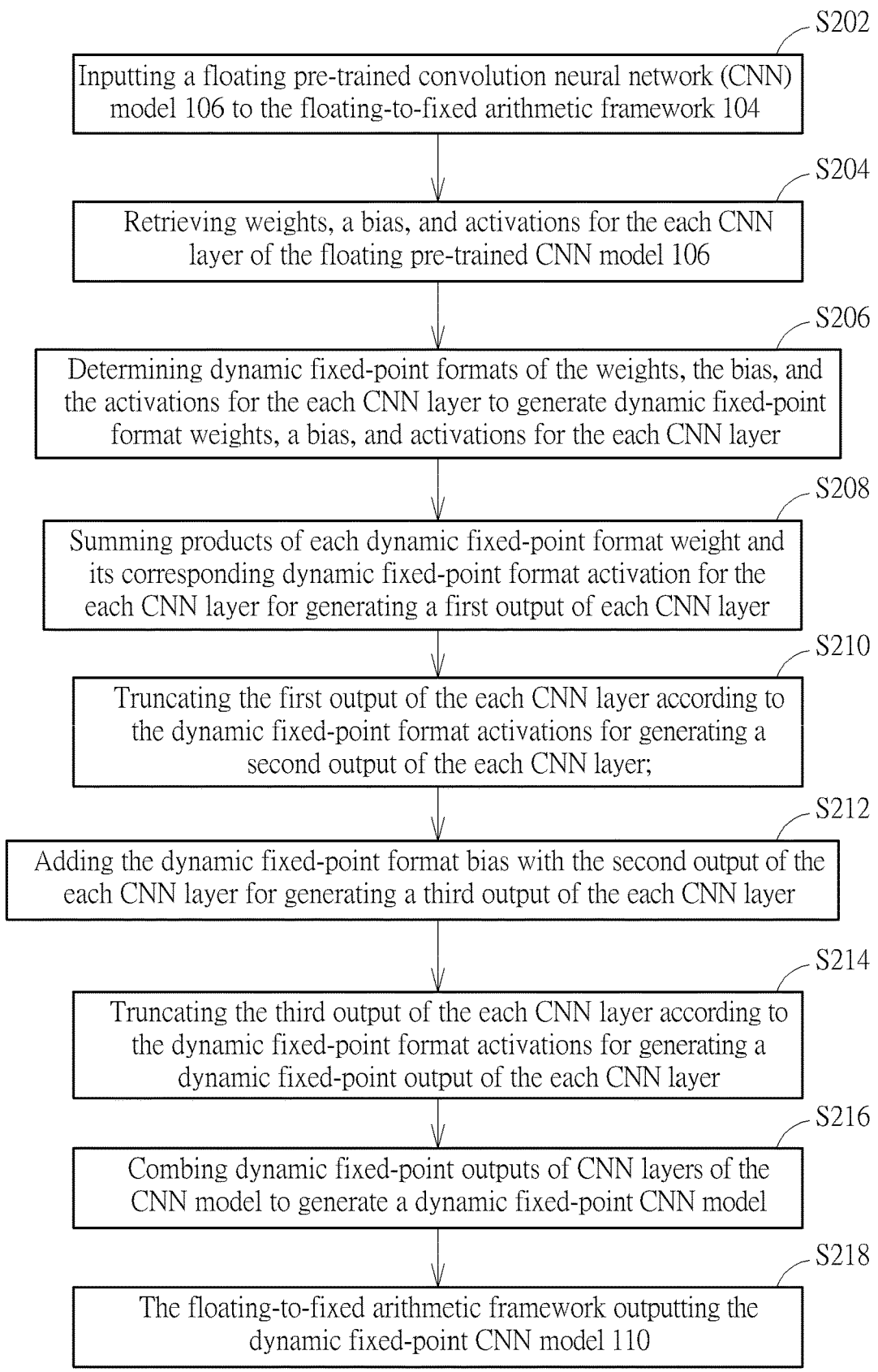
FIG. 2 is a flowchart of a method for operating a floating-to-fixed arithmetic framework according to an embodiment.

FIG. 2 is a flowchart of a method for operating a floating-to-fixed arithmetic framework according to an embodiment. The method comprises the following steps:

Step S202: inputting a floating pre-trained convolution neural network (CNN) model 106 to the floating-to-fixed arithmetic framework 104;

Step S204: retrieving weights, a bias, and activations for the each CNN layer of the floating pre-trained CNN model 106;

Step S206: determining dynamic fixed-point formats of the weights, the bias, and the activations for the each CNN layer of the floating pre-trained CNN model 106 to generate dynamic fixed-point format weights, a dynamic fixed-point format bias, and dynamic fixed-point format activations for the each CNN layer of the floating pre-trained CNN model 106;

Step S208: summing products of each dynamic fixed-point format weight and its corresponding dynamic fixed-point format activation for the each CNN layer of the floating pre-trained CNN model 106 for generating a first output of each CNN layer of a CNN model;

Step S210: truncating the first output of the each CNN layer of the CNN model according to the dynamic fixed-point format activations for generating a second output of the each CNN layer of the CNN model;

Step S212: adding the dynamic fixed-point format bias with the second output of the each CNN layer of the CNN model for generating a third output of the each CNN layer of the CNN model;

Step S214: truncating the third output of the each CNN layer of the CNN model according to the dynamic fixed-point format activations for generating a dynamic fixed-point output of the each CNN layer of the CNN model;

Step S216: combing dynamic fixed-point outputs of CNN layers of the CNN model to generate a dynamic fixed-point CNN model; and Step S218: the floating-to-fixed arithmetic framework outputting the dynamic fixed-point CNN model 110.

Figure 3:
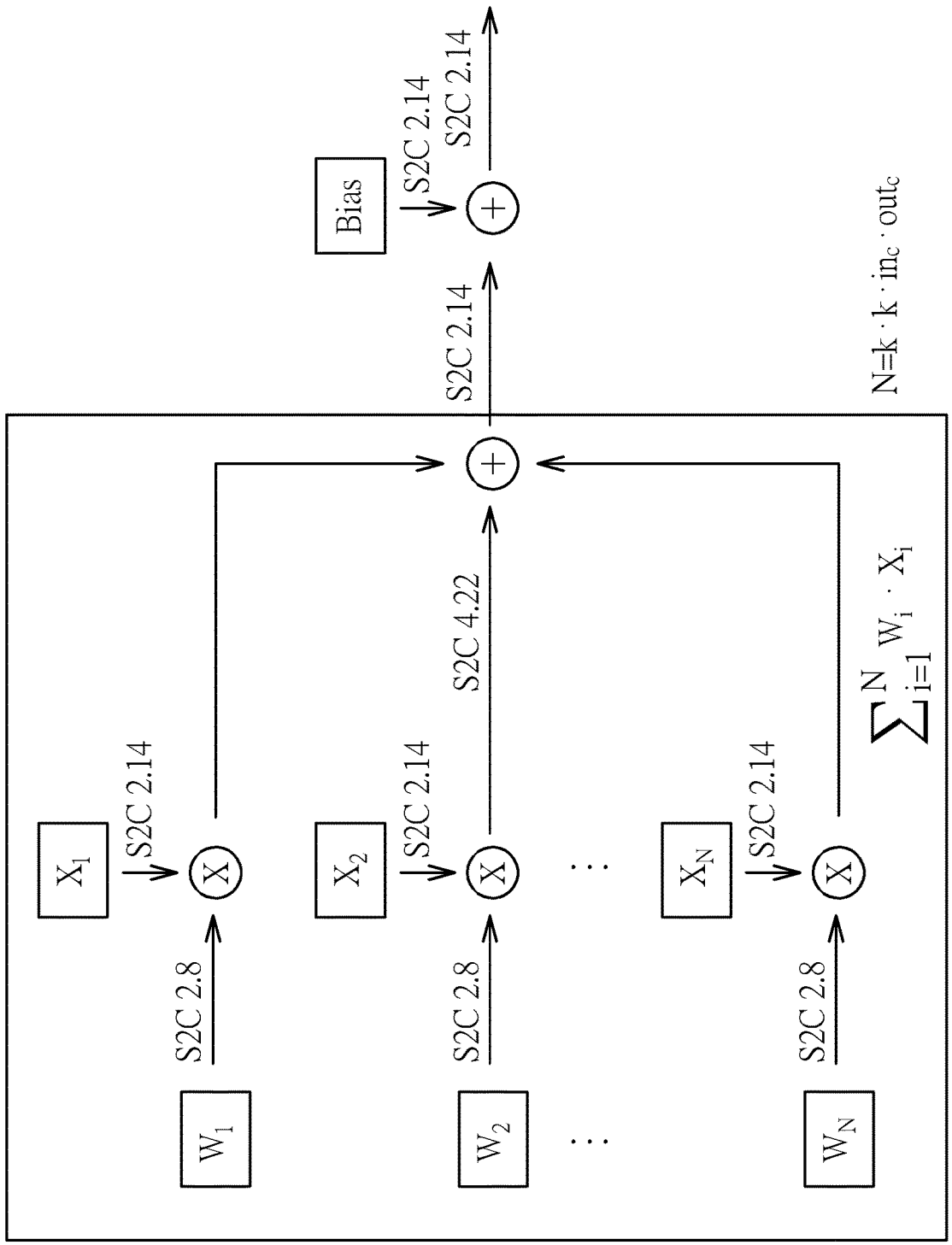
FIG. 3 shows a block diagram of dynamic fixed-point of one layer of a CNN model according to an embodiment.

FIG. 3 shows a block diagram of dynamic fixed-point of one layer of the CNN model according to an embodiment. In CNN computation, the key component is the multiplication of weights and activations, as expressed in equation (1).

$$\Sigma_{i=1}^{N} W_i X_i + B \qquad (1)$$

Where W is weight, X is activation, B is the bias, $N = k \cdot k \cdot in_c \cdot out_c$ which is the total number of weights. K is the kernel size, $in_c$ is the number of input channels, and $out_c$ is the number of output channels. In this equation, we can see there are N arithmetic operations in each layer of the CNN model. This is the most complicate part that requires lots of arithmetic operations. As shown in FIG. 3, the product of $W_1$ and $X_1$ to the product of $W_N$ and $X_N$ are added together, then the bias B is added to the sum of the products. The symbol "S2C" represents a signed two's complement and in the format "M1.M2", M1 represents an integer word length and M2 represents a fractional word length. For example, weight $W_1$ has an S2C of "2.8". This means $W_1$ has an integer word length of 2, and a fractional word length of 8. Activation $X_1$ has an S2C of "2.14" indicating $X_1$ has an integer word length of 2, and a fractional word length of 14. The product of $W_1$ and $X_1$ has an S2C of "4.22" indicating the product has an integer word length of 4, and a fractional word length of 22. After the product of $W_1$ and $X_1$ to the product of $W_N$ and $X_N$ are summed up, to reduce the arithmetic operation overhead, the sum is truncated to have an S2C of "2.14". Then bias B having an S2C of "2.14" is added to the truncated sum to generate a dynamic fixed-point output of a layer of the CNN model which also has an S2C of "2.14".

The dynamic fixed-point format method is used to obtain the fixed-point formats for weights, biases, and activations as mentioned above, including two parameters to represent a dynamic fixed-point format as shown in equation (2):

$$s = (2^{p-1} - 1)/\mathrm{Max}_v \qquad (2)$$

In Eq. (2), p represents the quantization bit-width, and the symmetric dynamic range is $[-\mathrm{Max}_v, \mathrm{Max}_v]$. From the perspective of weights, $\mathrm{Max}_v$ equals $\max(|\min(w)|, |\max(w)|)$ where $|\max(w)|$ is the absolute value of the weight having the largest value and $|\min(w)|$ is the absolute value of the weight having the smallest value. In FIG. 3, if W1 is greater than W2 to WN, and W2 is smaller than any other Wi, then $\mathrm{Max}_v$ equals to the maximum of $|W_1|$ and $|W_2|$. From the perspective of activations and biases, $\mathrm{Max}_v$ is the maximum value of activations and biases respectively. S is the scalar factor which bridges the gap between the floating point value and fixed-point value.

First, for each layer, the scalar factor s mentioned in equation 2 is expressed as equation (3):

$$s = q \cdot 2^n = \frac{2^{p-1} - 1}{\mathrm{Max}_v} \qquad (3)$$

where q equals $$\frac{s}{2^n},$$

n is the number of fractional bits, and q represents the residual value between s and $2^n$.

According to the given resolution of dynamic fixed-point defined as M, the integer word length M1 equals M minus M2. Using the proposed floating scalar factor value, the proposed the algorithm can achieve the approximated theoretically signal to quantization noise ratio (SQNR).

Figure 4A:
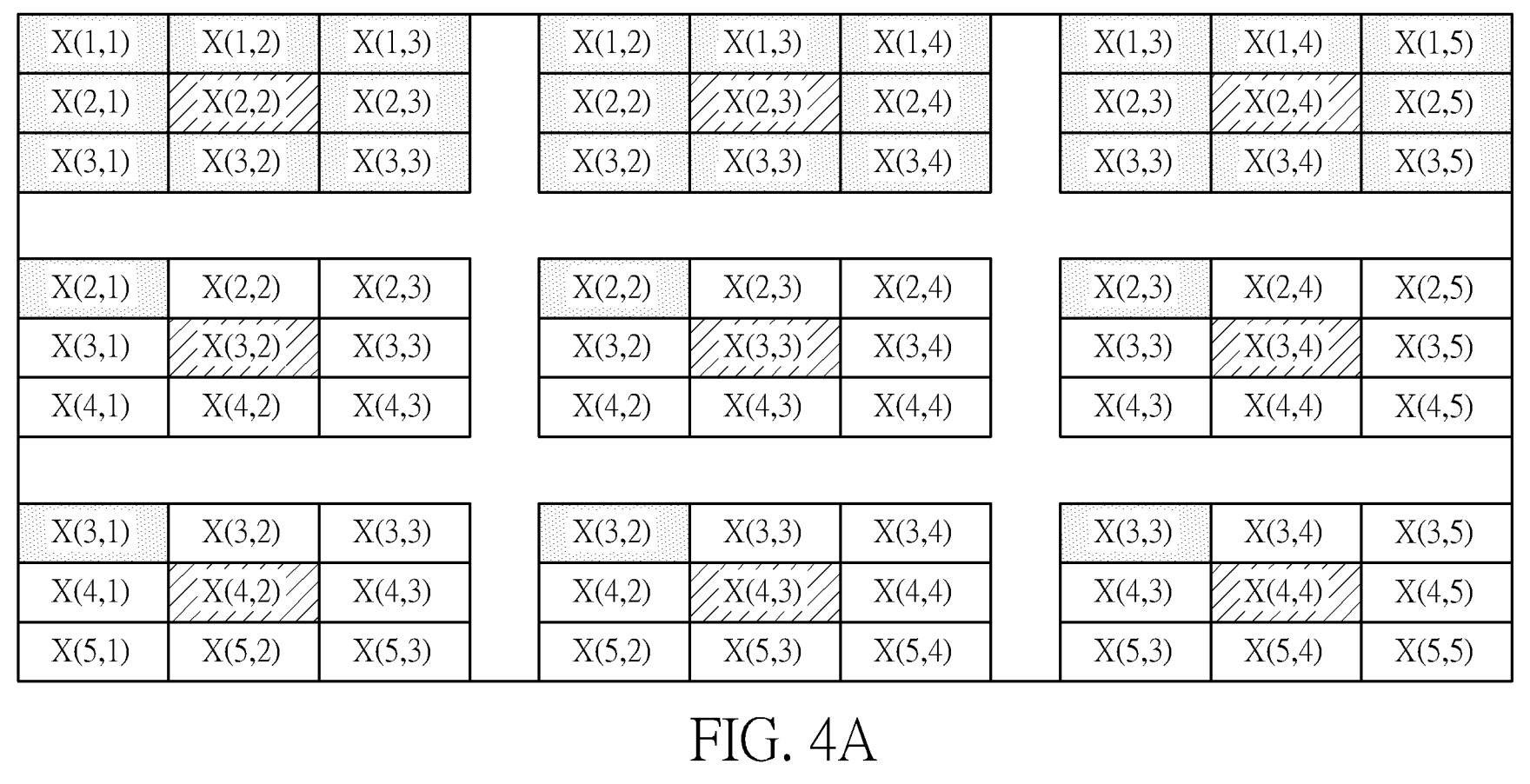

FIGS. 4A-4C are an embodiment of an input image based on a 3×3 computing engine at a channel. According to the reconfigurable arithmetic framework system, a 3×3 computing engine is used as a reconfigurable cell to calculate a convolutional layer by dynamic fixed-point design. To simplify the illustration, assume the input image size is 5×5×1, where input width is 5, input height is 5, and the number of input channels is $in_c$, the number of output channels is $out_c$, the kernel size is 3×3. FIG. 4A illustrates how to re-arrange the input image in order to efficiently use the reconfigurable 3×3 computing engine at channel 1. Meanwhile, the weight is constructed as FIG. 4B. Applying the 3×3 kernel weight, the general matrix multiplication (GEMM) at channel 1 is shown in FIG. 4C. In FIG. 4C, we will take Y(1,1) as an example in GEMM calculation at channel 1. The Y(1,1) equals (w(1,1)*x(1,1)+w(1,2)*x(1,2)+ . . . +w(3,3)*x(3,3)) and then the dynamic fixed-point method is applied to multiply scalar factor s. After that, the same GEMM calculation and dynamic fixed-point method are applied in the rest channels.

Figure 5:
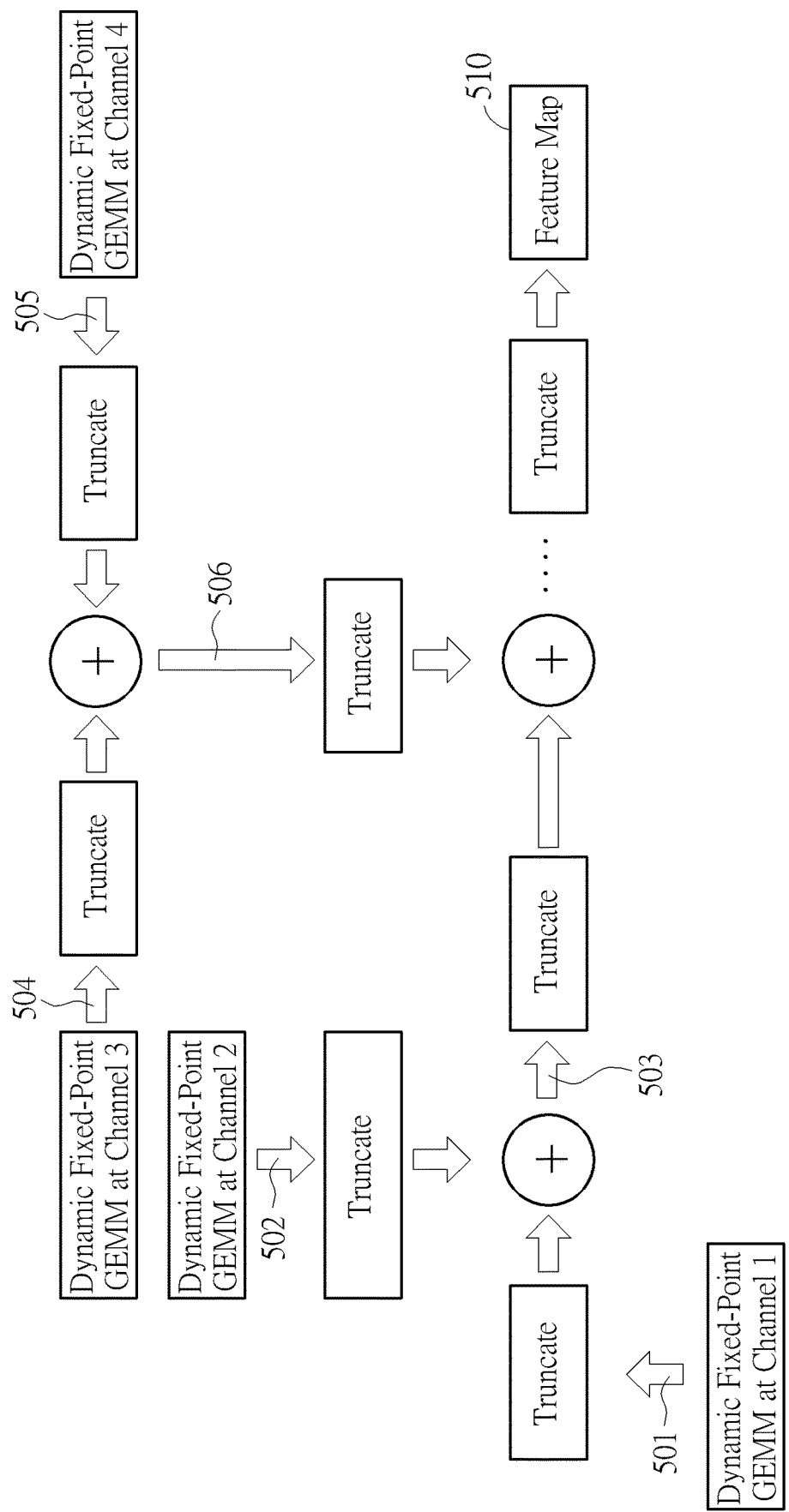
FIG. 5 shows a flow of dynamic fixed-point of one layer of a CNN model in reconfigurable hardware design according to an embodiment

FIG. 5 shows a flow of dynamic fixed-point of one layer of a CNN model in reconfigurable hardware design according to an embodiment. In this embodiment, the 3×3 computing engine is used as reconfigurable cell to calculate a convolutional layer by dynamic fixed-point design. The general matrix multiplication (GEMM) with dynamic fixed-point method at first channel outputs first data 501. The same GEMM with dynamic fixed-point method calculation is applied in the second channel to output second data 502. The output data 501 and 502 are truncated according to dynamic fixed-point activation of one layer of a CNN model and then summed to generate first sum 503. The same GEMM with dynamic fixed-point method calculation is applied in the third channel to output third data 504 and the forth channel to output forth data 505. The output data 504 and 505 are truncated according to dynamic fixed-point activation of one layer of a CNN model and then summed to generate second sum 506. These steps are applied to the rest channels of one layer of the CNN model and a feature map 510 of one layer of the CNN model is outputted. Calculating each layer of the CNN model will generate the dynamic fixed-point CNN model.

The invention provides a system and method for operating a floating-to-fixed arithmetic framework. The system and method comprises a floating-to-fix arithmetic framework on an arithmetic operating hardware such as central processing unit (CPU) for computing a floating pre-trained convolution neural network (CNN) model to a dynamic fixed-point CNN model. The floating-to-fix arithmetic framework receives a floating pre-trained convolution neural network (CNN) model and retrieves weights, a bias, and activations for the each CNN layer of the floating pre-trained CNN model. The floating-to-fix arithmetic framework then computes each channel of each layer of the floating pre-trained convolution neural network (CNN) model for generating a dynamic fixed-point CNN model. This floating to fixed format optimizes the CNN model to fit the dependent hardware constraints. The outputted dynamic fixed-point CNN model is capable of implementing a high performance convolution neural network (CNN) on a resource limited embedded system.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An arithmetic framework system comprising:
a floating-to-fixed arithmetic framework on an arithmetic operating hardware, the floating-to-fixed arithmetic framework being configured to:
receive a floating pre-trained convolution neural network (CNN) model;
retrieve weights, a bias, and activations for each CNN layer of the floating pre-trained CNN model;
determine a symmetric dynamic range between an absolute value of a maximum value of absolute values of the weights and a negative absolute value of the maximum value of the absolute values of the weights, a maximum value of biases for CNN layers of the floating pre-trained CNN model, and a maximum value of the dynamic fixed-point format activations for each CNN layer of the floating pre-trained CNN model;
sum products of each dynamic fixed-point format weight and its corresponding dynamic fixed-point format activation for the each CNN layer of the floating pre-trained CNN model for generating a first output of each CNN layer of a CNN model;
generate a second output of the each CNN layer of the CNN model and express the second output to have an integer word length and a fractional word length same as the dynamic fixed-point format activations;
add the dynamic fixed-point format bias with the second output of the each CNN layer of the CNN model for generating a third output of each CNN layer of the CNN model;
truncate the third output of the each CNN layer of the CNN model according to the dynamic fixed-point format activations for generating a dynamic fixed-point output of the each CNN layer of the CNN model;
combine dynamic fixed-point outputs of CNN layers of the CNN model to generate a dynamic fixed-point CNN model; and
output the dynamic fixed-point CNN model; and
a memory configured to save the floating pre-trained convolution neural network (CNN) model, the CNN model, and the dynamic fixed-point CNN model.

2. The arithmetic framework system of claim 1, wherein the arithmetic operating hardware is a central processing unit (CPU) or a graphics processing unit (GPU).

3. The arithmetic framework system of claim 1, wherein the floating-to-fixed arithmetic framework is further configured to:
input the dynamic fixed-point CNN model to the floating-to-fixed arithmetic framework.

4. A method for operating a floating-to-fixed arithmetic framework, the method comprising:
inputting a floating pre-trained convolution neural network (CNN) model to the floating-to-fixed arithmetic framework in an arithmetic operating hardware;
retrieving weights, a bias, and activations for each CNN layer of the floating pre-trained CNN model by the arithmetic operating hardware;
determining a symmetric dynamic range between an absolute value of a maximum value of absolute values of the weights and a negative absolute value of the maximum value of the absolute values of the weights, a maximum value of biases for CNN layers of the floating pre-trained CNN model, and a maximum value of the dynamic fixed-point format activations for each CNN layer of the floating pre-trained CNN model by the arithmetic operating hardware;

summing products of each dynamic fixed-point weight and its corresponding dynamic fixed-point format activation for the each CNN layer of the floating pre-trained CNN model for generating a first output of each CNN layer of a CNN model by the arithmetic operating hardware;

truncating the first output of the each CNN layer of the CNN model according to the dynamic fixed-point format activations for generating a second output of the each CNN layer of the CNN model by the arithmetic operating hardware;

adding the dynamic fixed-point format bias with the second output of the each CNN layer of the CNN model for generating a third output of the each CNN layer of the CNN model by the arithmetic operating hardware;

generating a dynamic fixed-point output of the each CNN layer of the CNN model and expressing the second output to have an integer word length and a fractional word length same as the dynamic fixed-point format activations;

combining dynamic fixed-point outputs of CNN layers of the CNN model to generate a dynamic fixed-point CNN model by the arithmetic operating hardware; and the floating-to-fixed arithmetic framework outputting the dynamic fixed-point CNN model.

5. The method of claim 4, further comprising:
inputting the dynamic fixed-point CNN model to the floating-to-fixed arithmetic framework.

6. A method for operating a floating-to-fixed arithmetic framework, the method comprising:
inputting a floating pre-trained convolution neural network (CNN) model to the floating-to-fixed arithmetic framework in an arithmetic operating hardware;

retrieving weights, a bias, and activations for each CNN layer of the floating pre-trained CNN model by the arithmetic operating hardware;

determining a symmetric dynamic range between an absolute value of a maximum value of absolute values of the weights and a negative absolute value of the maximum value of the absolute values of the weights, a maximum value of biases for CNN layers of the floating pre-trained CNN model, and a maximum value of the dynamic fixed-point format activations for each CNN layer of the floating pre-trained CNN model;

summing products of each dynamic fixed-point weight and its corresponding dynamic fixed-point format activation for the each CNN layer of the floating pre-trained CNN model for generating a first output of each CNN layer of a CNN model by the arithmetic operating hardware;

truncating the first output of the each CNN layer of the CNN model according to the dynamic fixed-point format activations for generating a second output of the each CNN layer of the CNN model by the arithmetic operating hardware;

adding the dynamic fixed-point format bias with the second output of the each CNN layer of the CNN model for generating a third output of the each CNN layer of the CNN model by the arithmetic operating hardware;

generating a dynamic fixed-point output of the each CNN layer of the CNN model and expressing the dynamic fixed-point output to have an integer word length and a fractional word length same as the dynamic fixed-point format activations;

combining dynamic fixed-point outputs of CNN layers of the CNN model to generate a dynamic fixed-point CNN model by the arithmetic operating hardware; and the floating-to-fixed arithmetic framework outputting the dynamic fixed-point CNN model.

* * * * *